United States Patent [19]

Mohr

[11] Patent Number: 4,850,048

[45] Date of Patent: Jul. 18, 1989

[54] OPTICAL RECEIVER WITH AUTOMATIC POLARIZATION MATCHING

[75] Inventor: Friedemann Mohr, Renningen, Fed. Rep. of Germany

[73] Assignee: Alcatel N.V., Amsterdam, Netherlands

[21] Appl. No.: 94,141

[22] Filed: Sep. 8, 1987

[30] Foreign Application Priority Data

Sep. 9, 1986 [DE] Fed. Rep. of Germany ....... 3630619

[51] Int. Cl.$^4$ ............................................. H04B 9/00
[52] U.S. Cl. .................................. 455/616; 455/612; 455/619
[58] Field of Search ............... 455/606, 607, 612, 616, 455/617, 619, 609, 610, 608

[56] References Cited

U.S. PATENT DOCUMENTS 4,723,315  2/1988  Wetherell ........................... 455/619

FOREIGN PATENT DOCUMENTS 3150697   7/1983  Fed. Rep. of Germany .
0047524   3/1985  Japan ................... 455/619
0144699   1/1986  Japan ................... 455/619
8607513  12/1986  PCT Int'l Appl. ......... 455/619

OTHER PUBLICATIONS

Booth et al., "Temperature Tuning of LiNbO3 Electro Optic Waveguide TE/TM Mode Converters", Electronic Letters, 12-6-84, vol. 20 #25/26, pp. 1045-1047.

R. C. Alferness, Electrooptic Guided-Wave Device for General Polarization Transformations, IEEE J Quantum Electronics, v. QE-17#6, Jun. '81.

D. W. Smith, Coherent Fiberoptic Communications, Laser Focus/Electro-Optics, Nov. '85.

R. A. Linke et al, Coherent Lightwave Transmission Over 150 km Fiber Lengths at 400 Mb/s and 1 Gb/s Data Rates Using DPSK Modulation, ECOC/IOOC, 3 Oct. '85.

R. C. Booth et al., Temperature Tuning of LiNbO3 Electro-Optic Waveguide TE/TM Mode Convertors, Elecronics Letters v 20 #25/26, 6 Dec. '84.

Primary Examiner—Robert L. Griffin
Assistant Examiner—Leslie Van Beek
Attorney, Agent, or Firm—Christie, Parker & Hale

[57] ABSTRACT

An optical receiver is disclosed in which a portion of the electric signal produced by optical-to-electric conversion is coupled out and fed to an automatic control system (4, 5, 8, 9, 12-17). The automatic control system contains polarization control elements (4, 5) which control the polarization of the received light beam relative to that produced by the local oscillator so that the electric output signal is maximized. There is no requirement for either light beam to be polarized in a particular direction in order to have optimum matching.

9 Claims, 2 Drawing Sheets

OPTICAL RECEIVER WITH AUTOMATIC POLARIZATION MATCHING

TECHNICAL FIELD

The present invention relates to an optical receiver, and more particularly to means for matching the polarization states of the received light beam with that from a local oscillator.

BACKGROUND ART

In the article by D. W. Smith entitled "Coherent Fiber-optic Communications" which was published in FOCUS/Electro-Optics for November 1985 at pages 92 et seq., there is disclosed an optical heterodyne or homodyne receiver wherein the received polarized light beam is combined with a second polarized light beam from a local oscillator; the resultant combined light beam is converted by an optical-to-electric transducer into an electric signal which subject to further processing.

In such an optical receiver, it is desirable for the polarization states of the received light beam and the light beam produced by the local oscillator to match as well as possible. This can be accomplished, for example, by using a polarization-holding fiber for the transmission path to the receiver and connecting it to the receiver in such a way that the polarization directions of the received light beam and the light beam from the local oscillator have the desired relationship to each other. However, polarization-holding optical fibers have certain disadvantages; for example, they have relatively high loss.

A polarization control system is disclosed in published German patent application DE-OS 31 50 697, in which control signals are derived which cause the polarization of the light beam to oscillate to a negligible extent about a predetermined value by decoupling that portion of the light beam which does not have the predetermined polarization direction and feeding it an opto-electric transducer which is followed by mixers and a low pass filter.

DISCLOSURE OF INVENTION

It is an object of the present invention to provide an optical receiver in which the polarization of the light beams need not be precisely oriented in a predetermined direction. To that end, at least a portion of the electric output signal produced by the optical-to-electric transducer is fed to an automatic control system. The automatic control system contains polarization control elements which control the polarization of the received light beam and/or of the local oscillator so that the electric output signal is maximized. Accordingly, the polarization of the received light beam is always optimally matched to the polarization of the light beam produced by the local oscillator.

BRIEF DESCRIPTION OF DRAWINGS

The invention will now be explained in further detail with reference to the accompany drawing, in which.

BEST MODE FOR CARRYING OUT THE INVENTION

Figure 1:
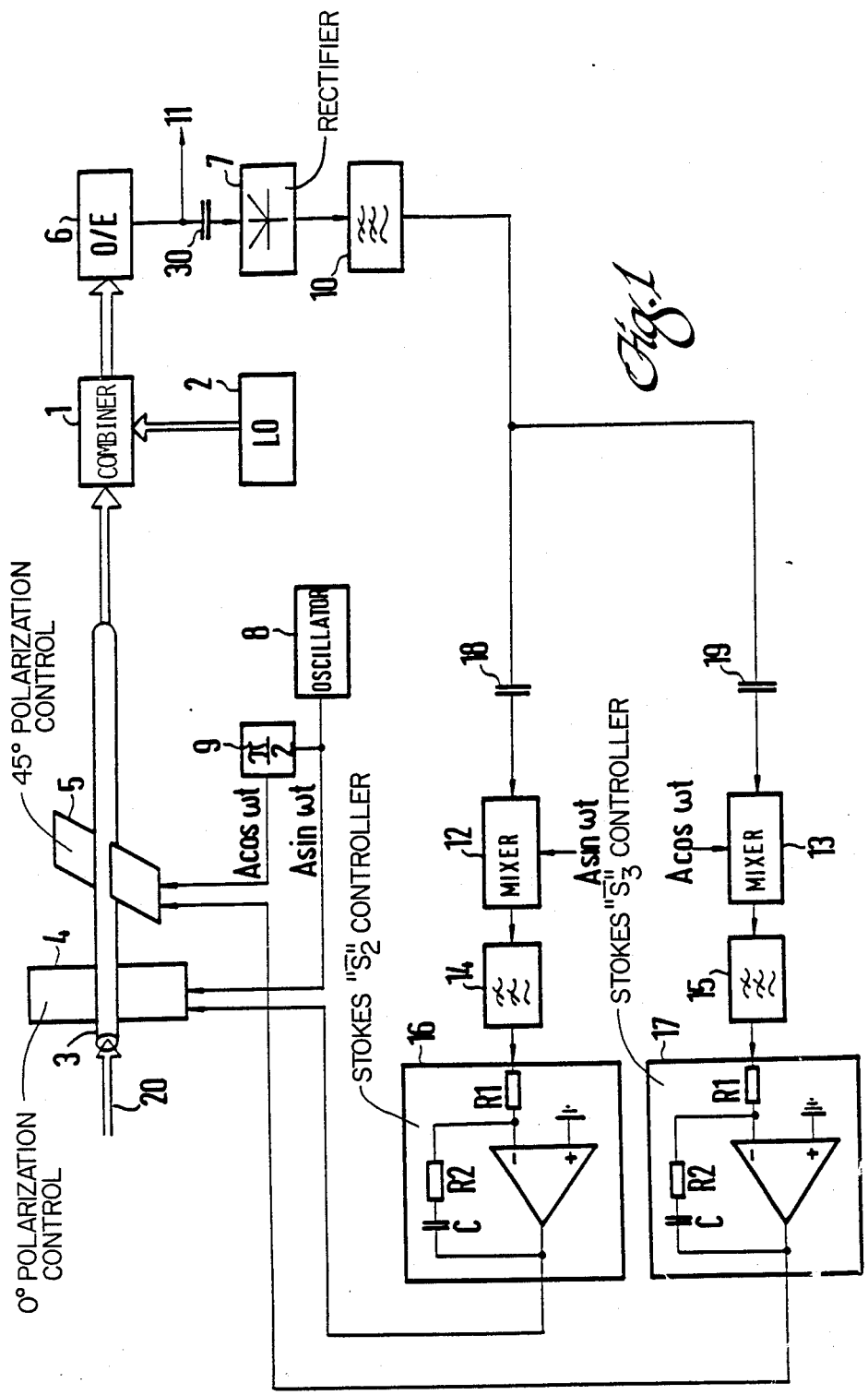
FIG. 1 is a block diagram of an exemplary preferred embodiment of a novel optical heterodyne receiver constructed, in accordance with the present invention and, FIG. 2 shows a variation thereof.

A received light beam 20 enters the optical heterodyne receiver and is propagated through an optical fiber 3. A local oscillator 2 produces a second light beam which is polarized. The light beam produced by the local oscillator and the received light beam 20 are heterodyned in an optical combiner 1. The combiner 1 is so designed that it has no effect on the respective polarization directions of the two input light beams. The output light beam of the combiner 1 is directed onto an optical-to-electric transducer 6. The electric output signal of the latter is passed on for further processing at output port 11. It is amplitude-, phase-, or frequency-modulated with the received information. A portion of this electric output signal is coupled out and fed to a full-wave rectifier 7. A capacitor 30 interposed between the optical-to-electric transducer 6 and the full-wave rectifier 7 blocks the DC component of the signal delivered by the optical-to-electric transducer, and passes only the AC component which includes the information with which the electric output signal is modulated. The full-wave rectifier 7 is followed by a low-pass filter 10. The low-pass filter 10 is designed to pass only certain low frequency signals, as will be further explained below. The output of the low-pass filter 10 is split into two equal components—one component being applied through a first capacitor 18, a first mixer 12, and a first low-pass filter 14 to a first controller 16, and the other component being applied through a second capacitor 19, a second mixer 13, and a second low-pass filter 15 to a second controller 17. The outputs of the two controllers 16 and 17 control the polarization control elements 4 and 5, respectively. These two polarization control elements 4 and 5 act on the polarization state of the light beam 20 in the optical fiber 3 in directions normal to this optical fiber. The direction of action of the two polarization control elements are inclined to one another at 45° and the direction in which the polarization control element 5 adjacent to the combiner 1 acts on the light beam 20 is inclined to the polarization direction of the output light beam of the local oscillator 2 at 45°. The polarization control elements delay the phases of the light signal components having mutually perpendicular polarization directions by different amounts. The first polarization control element produces a phase shift of $\delta$ and the second a phase shift of $\epsilon$. The phase shift depends on the pressure exerted by the respective polarization control element on the optical fiber. The first polarization control element 4 controls the Stokes parameter $\overline{S_2}$, and the second, 5, the Stokes parameter $\overline{S_3}$. By controlling these parameters, the polarization can be brought to the desired state, as is well known. This can be shown with the aid of the Poincare representation.

A polarization control system similar to that used here is disclosed in published German patent application DE-OS 31 50 697, in which that portion of a light beam which does not have the desired polarization direction is coupled out and then made zero. By placing such a polarization control system ahead of an optical heterodyne receiver, it is possible to couple the received light beam to the optical heterodyne receiver with a defined polarization direction, thus eliminating the need for polarization-holding optical fibers. But in that case, as with the use of polarization-holding optical fibers, it is still necessary to couple the received light beam to the optical heterodyne receiver with a defined polarization direction. This is to be contrasted with the heterodyne receiver disclosed herein, in which such a requirement is eliminated.

Referring again to the Figure, the polarization control elements 4, 5 can be of the design known from the above cited published German patent DE-OS 31 50 697. The voltages of the signals applied to the two polarization control elements should be different. They may differ in frequency or phase. If they differ in phase, the phase difference between the two applied signals should be $(2n+1)\pi/2$. This requirement is satisfied in the present case, where the signals Asinwt and Acoswt are used.

An oscillator 8 generates a sinusoidal signal of frequency w and amplitude A. This signal is fed to the first control element 4. Part of the signal from the oscillator 8 is applied to a phase shifter 9, which produces a phase shift of $\pi/2$, and the output of the phase shifter, the signal Acoswt, is fed to the second control element 5.

The amplitude A has a value of 5 V, and w is 180 kHz. The value of w is chosen to lie outside the spectrum of the modulation frequencies at which the carrier signal is modulated with information. In this manner, any undesired crosstalk is avoided. The two signals Asinwt and Acoswt are the above-mentioned AC voltage signals which are passed by the low-pass filter 10.

If these signals are applied to the polarization control elements, the latter exert pressures on the optical fiber 3 which vary with the signal frequency w. As a result, the state of polarization oscillates about a mean value at the frequency w. If a suitable value is chosen for the frequency w, this oscillation will have no disturbing effect during the utilization of the light beam. The oscillation of the polarization state is necessary in order that the control signals can be produced in the manner described in the following.

The capacitors 18, 19 between the low-pass filter 10 and the mixers 12, 13 serve to prevent any DC voltage components from reaching the mixers 12, 13.

The first polarization control element 4 is fed with the signal Asinwt. Accordingly, the signal applied to the second input of the mixer 12, whose output is fed to the controller 16 producing the control signal for the first polarization control element 4, is the signal Asinwt. The second input of the other mixer 13 is supplied with the signal Acoswt.

To produce the control signals in the two controllers 16 and 17, which are implemented as PI controllers, only the DC voltage components of the outputs of the mixers 12 and 13 are applied to the controllers. They are proportional to the Stokes parameters $\overline{S_2}$ and $\overline{S_3}$. These different signals, which are necessary to produce control signals unambiguously assignable to the two polarization control elements, are obtained only if signals distinguishable from each other are applied to the electrodes of the polarization control elements. The mixers 12 and 13 are followed by low-pass filters 14 and 15, respectively, so that only the DC voltage components of the mixer outputs are applied to the two PI controllers. The PI controller 16 produces the control signal for the first polarization control element 4, and the PI controller 17 produces the control signal for the second polarization control element 5. PI controllers are known per se. They contain a differential amplifier whose "+ input" is grounded, and whose "− input" is connected to the preceding low-pass filter through a resistor R1. Connected across the "− input" and the output of the differential amplifier are a capacitor C and a resistor R2.

The design of a PI controller in accordance with the controlled variables is familiar to those skilled in the art (e.g., Frohr/Orttenburger, "Einfuhrung in die elektronische Regelungstechnik", Siemens AG, Berlin 1970, Chapter 4). In the present automatic control system, the controllers produce voltages which are large enough to drive the polarization control elements direct.

The principles underlying the present invention are also applicable if the light beam whose polarization state is to be controlled does not propagate in an optical fiber. In that case, other polarization control elements must be used. A suitable polarization control element may be, for example, a lithium-niobate crystal through which the light beam is passed. Using the anisotropic electrooptical effect, whose magnitude depends on the applied voltage, those portions of the light beam which have mutually perpendicular polarization directions and pass through the crystal are delayed by different amounts of time. The first control element thus acts as an optical phase shifter for the two differently polarized components of the light beam, while the second control element acts as a TE to TM (transverse electric to transverse magnetic) mode converter. Thus, in that case also, conditions are created which correspond to the case of the polarization control elements acting on the optical fiber, when a voltage causing high-frequency oscillation about a mean state and a voltage representing the control signal are applied to the crystal.

If the light beam 20 propagates in a planar waveguide, in order to obtain a maximum electric output signal, the polarization direction of the light from the local oscillator 2 should lie either in the plane of the planar waveguide or in a plane perpendicular thereto.

It will thus be appreciated that by means of polarization control in accordance with the present invention, the polarization direction of the received light beam is optimally matched to that of the light beam produced by the local oscillator. In this manner, a maximum output signal is obtained independently of the polarization direction of the light beam 20 entering the optical heterodyne receiver.

Figure 2:
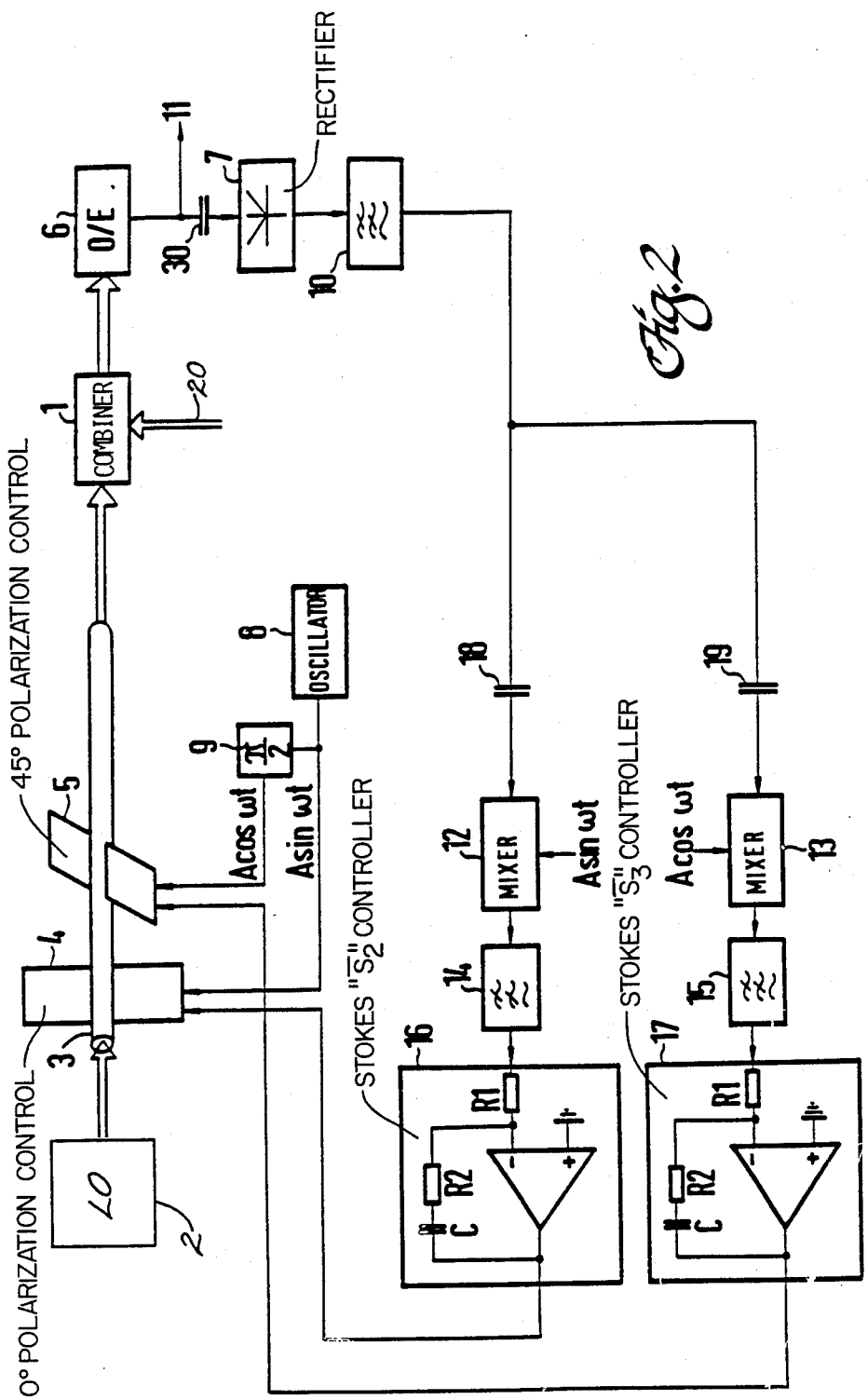

In the above description it was assumed that the light beam whose polarization state is to be controlled is the received light beam. It is also possible to control the polarization state of the light beam produced by the local oscillator in such a way that, when the received light beam is combined with the light beam from the local oscillator, their polarization directions are the same. As shown if FIG. 2, this may be simply achieved by merely modifying the embodiment shown in FIG. 1 by moving the polarization control elements 4 and 5 to a location between the local oscillator 2 and the optical combiner 1. The above-described control process itself remains unchanged.

Preferably, for optimum results, the polarization directions of the light beams and the directions in which the light beams are acted on to effect polarization control should be chosen as follows:

Case 1: the received light beam is controlled:
(a) the first polarization control element acts on the received light beam in a direction of 0° or 90°;
(b) the second polarization control element acts on the received light beam in a direction of 45° or 135°;

(c) the linear polarization of the light beam produced by the local oscillator points in a direction of 0° or 90°.

Case 2: the light beam produced by the local oscillator is controlled:
(a) the linear polarization of the light beam produced by the local oscillator points in a direction of 0° or 90°;
(b) the polarization control element adjacent to the local oscillator acts on the light beam from the local oscillator in a direction of 45° or 135°;
(c) the other polarization control element acts on the light beam from the local oscillator in a direction of 0° or 90°.

If the light beam propagates in an integrated optical device rather than in an optical fiber, an integrated optical solution should then be used for polarization control also. In that case, the control element with a 0° or 90° orientation relative to the polarization direction of the light beam produced by the local oscillator may be replaced by an integrated optical phase modulator, and the control element with a 45° or 135° relative orientation by a TE to TM mode converter.

The present invention has been described above with regard to the certain presently contemplated specific embodiments of the invention. It will be appreciated by those skilled in the art that modifications and variations thereof are possible within the spirit and scope of the appended claims.

What is claimed is:

1. An optical receiver for receiving a polarized light beam modulated with information, comprising:
    a local oscillator for producing a second polarized light beam;
    a combiner for combining the received polarized light beam with the second polarized light beam produced by the local oscillator;
    first propagation means for propagating the received polarized light beam from the point it enters the receiver to the point it enters the combiner;
    second propagation means for propagating the second polarized light beam from the local oscillator to the point it enters the combiner,
        at least one of said first and second propagation means including polarization control means to vary the polarization of the propagated signal in response to at least one polarization control signal;
    a single optical-to-electric transducer responsive to the entire output of the combiner for directly producing a single electric output signal modulated with the received information, and
    a polarization control circuit responsive to at least a predetermined portion of said single electric output signal for producing said at least one polarization control signal, wherein the polarization of said received polarized light beam relative to said second polarized light beam at the point where they enter the combiner is automatically controlled in such a way that the amplitude of said single electric output signal of the optical receiver is always maximized despite any fluctuations in the polarization of the received polarized light beam at the point it enters the receiver.

2. An optical receiver for receiving a polarized light beam modulated with information, comprising:
    a local oscillator for producing a second polarized light beam;
    a combiner for combining the received polarized light beam with the second polarized light beam produced by the local oscillator;
    first propagation means for propagating the received polarized light beam to the point it enters the combiner, said first propagation means further comprising an optical fiber through which the received polarized light beam propagates;
    second propagation means for propagating the second polarized light beam to the point it enters the combiner,
        at least said first propagation means including polarization control means to vary the polarization of the received polarized light beam in response to two polarization control signals;
    an optical-to-electric transducer responsive to an output of the combiner for producing an electric output signal;
    a rectifier for passing at least a portion of the electric output signal;
    first and second mixers each mixing at least a portion of the output of said rectifier with respective first and second AC voltage signals differing from each other in phase and/or frequency, and
    first and second controllers responsive to the respective outputs of the two mixers for respectively producing said two polarization control signals, wherein:
        said polarization control means comprises two polarization control elements respectively responsive to said two polarization control signals and respectively acting on the optical fiber in two respective directions inclined to each other at 45°,
        each of the two polarization control elements, in addition to being fed with its respective polarization control signal, is coupled to a respective one of said AC voltage signals to thereby cause the state of polarization of the received polarized light beam to slightly oscillate about a mean value, and
        the polarization of said received polarized light beam is controlled in such a way that the amplitude of the electric output signal of the optical receiver is maximized.

3. An optical receiver as claimed in claim 2, wherein the two AC voltage signals differ in phase by $(2n+1)\pi/2$.

4. An optical receiver for receiving a polarized light beam modulated with information, comprising:
    a local oscillator for producing a second polarized light beam;
    a combiner for combining the received polarized light beam with the second polarized light beam produced by the local oscillator;
    first propagation means for propagating the received polarized light beam to the point it enters the combiner, said first propagation means further comprising a planar waveguide through which the received polarized light beam propagates;
    second propagation means for propagating the second polarized light beam to the point it enters the combiner,
        at least said first propagation means including polarization control means to vary the polarization of the received polarized light beam in response to two polarization control signals;

an optical-to-electric transducer responsive to an output of the combiner for producing an electric output signal;

a rectifier for passing at least a portion of the electric output signal;

first and second mixers each mixing at least a portion of the output of said rectifier with respective first and second AC voltage signals differing from each other in phase and/or frequency, and first and second controllers responsive to the respective outputs of the two mixers for respectively producing said two polarization control signals, wherein:

said polarization control means comprises a phase shifter and a TE to TM mode converter which each act on the received polarized light beam propagating in the planar waveguide, and which are respectively responsive to said two control signals, the phase shifter and the TE to TM mode converter, in addition to being fed with its respective control signal, is also coupled to a respective one of said AC voltage signal to thereby cause the state of polarization of the received polarized light beam to slightly oscillate about a mean value, and the polarization of said received polarized light beam is controlled in such a way that the amplitude of the electric output signal of the optical receiver is maximized.

5. An optical receiver as claimed in claim 4, wherein the two AC voltage signals differ in phase by $(2n+1)\pi/2$.

6. An optical receiver for receiving a polarized light beam modulated with information, comprising:

a local oscillator for producing a second polarized light beam;

a combiner for combining the received polarized light beam with the second polarized light beam produced by the local oscillator;

first propagation means for propagating the received polarized light beam to the point it enters the combiner;

second propagation means for propagating the second polarized light beam to the point it enters the combiner, said second propagation means further comprising an optical fiber through which the second polarized light beam propagates;

at least said second propagation means including polarization control means to vary the polarization of the second polarized light beam in response to two polarization control signals;

an optical-to-electric transducer responsive to an output of the combiner for producing an electric output signal;

a rectifier for passing at least a portion of the electric output signal;

first and second mixers each mixing at least a portion of the output of said rectifier with respective first and second AC voltage signals differing from each other in phase and/or frequency, and first and second controllers responsive to the respective outputs of the two mixers for respectively producing said two polarization control signals, wherein:

said polarization control means comprises two polarization control elements respectively responsive to said two polarization control signals and respectively acting on the optical fiber in two respective directions inclined to each other at 45°, each of the two polarization control elements, in addition to being fed with its respective polarization control signal, is coupled to a respective one of said AC voltage signals to thereby cause the state of polarization of the second polarized light beam to slightly oscillate about a mean value, and the polarization of said second polarized light beam is controlled in such a way that the amplitude of the electric output signal of the optical receiver is maximized.

7. An optical receiver as claimed in claim 6, wherein the two AC voltage signals differ in phase by $(2n+1)\pi/2$.

8. An optical receiver for receiving a polarized light beam modulated with information, comprising:

a local oscillator for producing a second polarized light beam;

a combiner for combining the received polarized light beam with the second polarized light beam produced by the local oscillator;

first propagation means for propagating the received polarized light beam to the point it enters the combiner second propagation means for propagating the second polarized light beam to the point it enters the combiner, said second propagation means further comprising a planar waveguide through which the second polarized light beam propagates;

at least said second propagation means including polarization control means to vary the polarization of the second polarized light beam in response to two polarization control signals;

an optical-to-electric transducer responsive to an output of the combiner for producing an electric output signal;

a rectifier for passing at least a portion of the electric output signal;

first and second mixers each mixing at least a portion of the output of said rectifier with respective first and second AC voltage signals differing from each other in phase and/or frequency, and first and second controllers responsive to the respective outputs of the two mixers for respectively producing said two polarization control signals, wherein:

said polarization control means comprises a phase shifter and a TE to TM mode converter which each act on the second polarized light beam propagating in the planar waveguide, and which are respectively responsive to said two control signals, the phase shifter and the TE to TM mode converter, in addition to being fed with its respective control signal, is also coupled to a respective one of said AC voltage signal to thereby cause the state of polarization of the second polarized light beam to slightly oscillate about a mean value, and the polarization of said second polarized light beam is controlled in such a way that the amplitude of the electric output signal of the optical receiver is maximized.

9. An optical receiver as claimed in claim 8, wherein the two AC voltage signals differ in phase by $(2n+1)\pi/2$.

* * * * *